United States Patent
Kelley et al.

(10) Patent No.: US 6,206,050 B1
(45) Date of Patent: Mar. 27, 2001

(54) HOSE USED TO INSTALL LOOSE FILL INSULATION

(75) Inventors: Maurice James Kelley, Paoli; Thomas Cuthbertson, Royersford; Edward Pentz, Boyertown; David M. Kawano, Lansdale; John Carre, Royersford, all of PA (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

(21) Appl. No.: 09/282,409

(22) Filed: Mar. 31, 1999

(51) Int. Cl.[7] ........................................ F16L 11/11
(52) U.S. Cl. ...................... 138/129; 138/122; 239/302
(58) Field of Search ................... 138/129, 122, 138/144, 149; 239/302

(56) References Cited

U.S. PATENT DOCUMENTS

| | | |
|---|---|---|
| 3,112,771 | 12/1963 | Bringolf . |
| 3,347,469 * | 10/1967 | Ross et al. ................. 239/302 X |
| 3,428,093 * | 2/1969 | Guiles ....................... 138/129 X |
| 4,121,624 | 10/1978 | Chen . |
| 4,303,104 * | 12/1981 | Hegler et al. .................... 138/121 |
| 4,337,800 | 7/1982 | Carlson . |
| 4,420,019 * | 12/1983 | Dillon ............................. 138/129 |
| 4,435,460 * | 3/1984 | Menzel ....................... 138/129 X |
| 4,490,575 * | 12/1984 | Kutnyak ..................... 138/129 X |
| 4,589,448 * | 5/1986 | Del Valle ................... 138/129 X |
| 4,865,255 * | 9/1989 | Luvisotto .................... 239/302 X |
| 4,976,289 | 12/1990 | Umemori . |
| 5,829,649 | 11/1998 | Horton ............................. 226/636 |

* cited by examiner

*Primary Examiner*—Patrick Brinson
(74) *Attorney, Agent, or Firm*—Duane Morris & Heckscher LLP (57) ABSTRACT

An improved hose is used to install loose fill insulation. The hose includes projections extending from an inner surface which serve to condition the insulation as it proceeds through the hose and is dispensed. In a first embodiment of the present invention, the projections are formed so as to be perpendicular to a longitudinal axis of the hose. In a second embodiment of the present invention, the projections are formed so as to be angled, by an angle less then ninety (90) degrees with respect to the longitudinal axis of the hose. In a third embodiment of the present invention, the projections are formed with a serrated edge. In a fourth embodiment of the present invention, the projections are formed as part of a cap member which is disposed around the periphery of the hose.

21 Claims, 8 Drawing Sheets

HOSE USED TO INSTALL LOOSE FILL INSULATION

FIELD OF THE INVENTION

The present invention relates to hoses, and in particular, a hose for installing loose fill insulation.

DESCRIPTION OF THE RELATED ART

Loose fill insulation is packaged in bags in which the material becomes compacted during storage and shipment. When removed from the bags, the insulation separates into clumps. In order to effectively install the insulation material, it must first be "fluffed up" or conditioned to reduce its density. Traditionally, pneumatic devices are used to both install the insulation and perform the conditioning. The conditioning process breaks up the clumps and then "fluffs" or "opens up" the insulation. The conditioned insulation is then applied pneumatically to an area by blowing it through a hose connected to the pneumatic device. The insulation may be moistened and/or treated with an adhesive in the pneumatic device before installation.

Figure 5A:
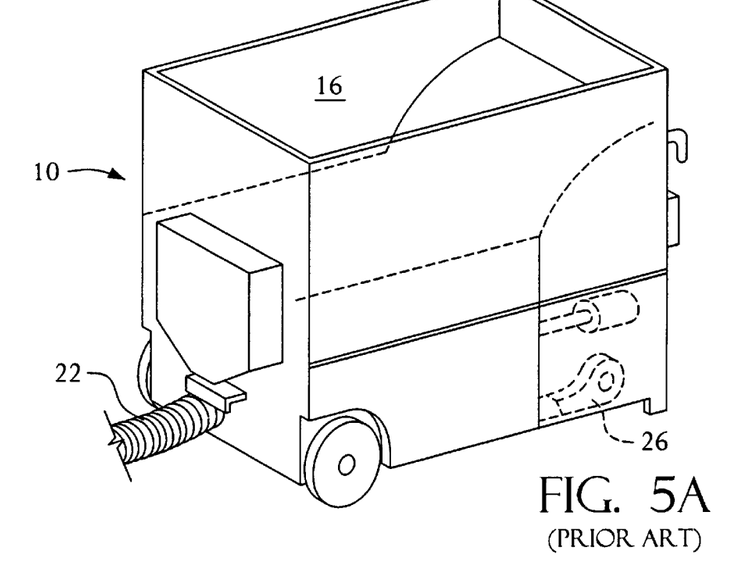
FIG. 5(a) is an isometric view of a conventional apparatus for dispensing loose fill insulation.
Figure 5B:
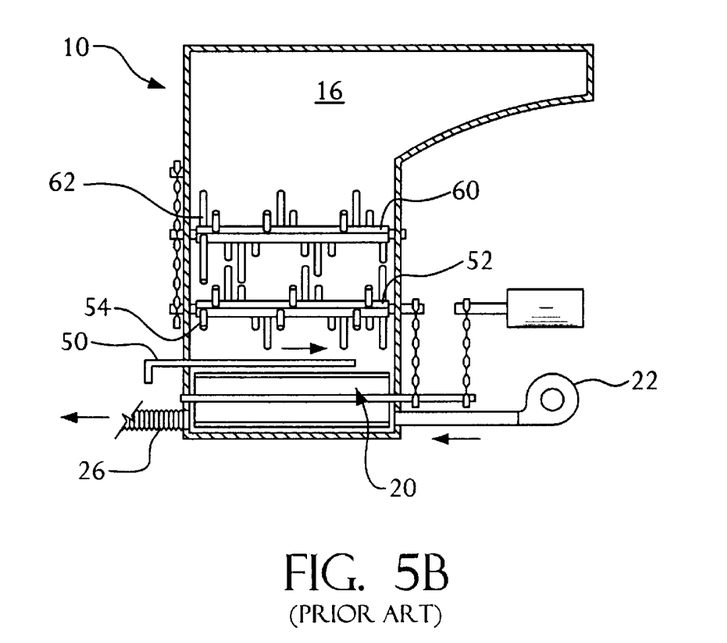
FIG. 5(b) is a cutaway side elevation view of the apparatus for dispensing loose fill insulation shown in FIG. 5(a).

FIGS. 5(a) and 5(b) show an example of a prior art pneumatic apparatus 10 for dispensing loose fill insulation. FIG. 5(a) is an isometric view of the apparatus 10, showing a hopper 16 for storing loose fill insulation, blower 22, and a hose 26 for dispensing the insulation. FIG. 5(b) is a side view of the apparatus 10 showing the inner workings in detail. The apparatus includes shafts 52, 60 with spikes 54, 62 extending therefrom for conditioning the insulation, which is placed in the hopper 16. The spikes 54, 62 break apart the clumps of insulation and prepare it to be dispensed. The conditioned insulation passes from the hopper 16 through the spikes 54, 62 to dispensing assembly 20, where it is blown through hose 26 by blower 22. In operation, the user simply points the hose 26 where he desires the insulation, and it is dispensed.

Often, the conditioning which occurs within the insulation dispensing apparatus is not enough to fully "open up" the insulation. If the insulation is not sufficiently conditioned when it leaves the dispensing apparatus it may be applied unevenly (i.e. in clumps), and it may not have the manufacturer's specified density for the installed thermal resistance desired. Conversely, insulation which is well conditioned allows adhesive and moisture to penetrate the insulation fibers, and applies to surfaces more evenly. Thus, there is currently a need for an improved device for increasing the conditioning of loose fill insulation.

SUMMARY OF THE INVENTION

The present invention is a tube for enhancing the conditioning of loose fill insulation. The tube preferably comprises a hose for dispensing loose fill insulation in an insulation dispensing apparatus. The tube includes projections formed around its inner periphery which serve to condition the insulation as it passes from one end of the tube to the other.

The above and other advantages and features of the present invention are better understood from the following detailed description of the preferred embodiments of the invention which is provided in connection with the accompanying drawings.

DETAILED DESCRIPTION

In a conventional insulation dispensing apparatus, such as the one described above and shown in FIGS. 5(a) and 5(b), loose fill insulation is placed into a hopper or housing of the apparatus where it is conditioned. The apparatus typically includes a mechanism for conditioning the insulation, as well as means for dispensing the insulation, such as a hose or other similar means. Sometimes, however, the conditioning mechanism within the dispensing apparatus does not provide sufficient conditioning. The present invention comprises an improved hose or tube 100, for attachment to an insulation dispensing apparatus. The hose or tube 100 includes a projection 140 along its inner surface 150 which serves to condition loose fill insulation as it passes through the tube.

Figure 1A:
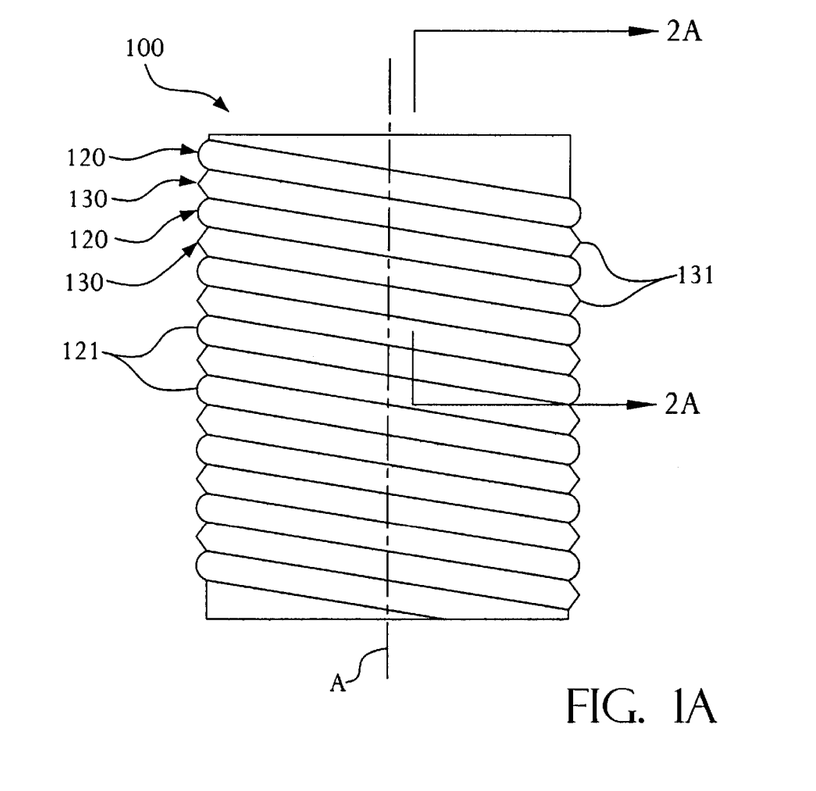
FIG. 1(a) is a front elevation view of the tube of the present invention.
Figure 1B:
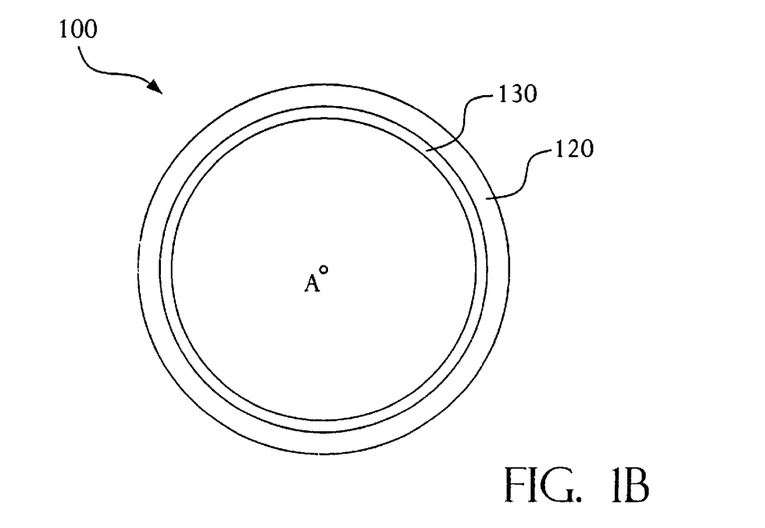
FIG. 1(b) is a top plan view of the tube of FIG. 1(a).

The present invention comprises a tube 100 for dispensing loose fill insulation. The tube 100 preferably comprises a flexible hose coupled to an insulation dispensing apparatus. In FIGS. 1(a) and 1(b), the tube 100 is formed as a cylindrical hose having an approximately circular cross-section. However, the tube 100 may have a cross-section of a variety of shapes (e.g. oval, rectangular, polygonal) without departing from the scope of the invention. Further, although it is preferred that the tube 100 be used as a flexible external hose for an insulation dispensing apparatus, the tube 100 may be formed as an internal component in an insulation dispensing apparatus which is either rigid or flexible. Alternately, the tube 100 may comprise the inner liner of a hose.

The tube 100 comprises an inner web 130 surrounded by an outer cap 120. In the exemplary embodiment shown in FIGS. 1(a) and (b), the inner web 130 is formed in a cylindrical shape, and the outer cap 120 is formed as a helical member extending around the outer periphery of the inner web 120. The inner web 130 includes a first helical projection 131 which extends around its entire outer periphery. The inner web 130 also includes a second helical projection 140 which extends around its inner periphery which is shown specifically in FIGS. 2(a)–2(d). The first helical projection 131 extends away from a longitudinal axis A of the inner web 130, and the second helical projection 140 extends towards the longitudinal axis A of the inner web 130. The outer cap 120 comprises a helical member 121 which is wound around the outer periphery of the inner web 130 and which is disposed at a position substantially aligned with helical projection 140, and in between portions of the helical projection 131.

Figure 2A:
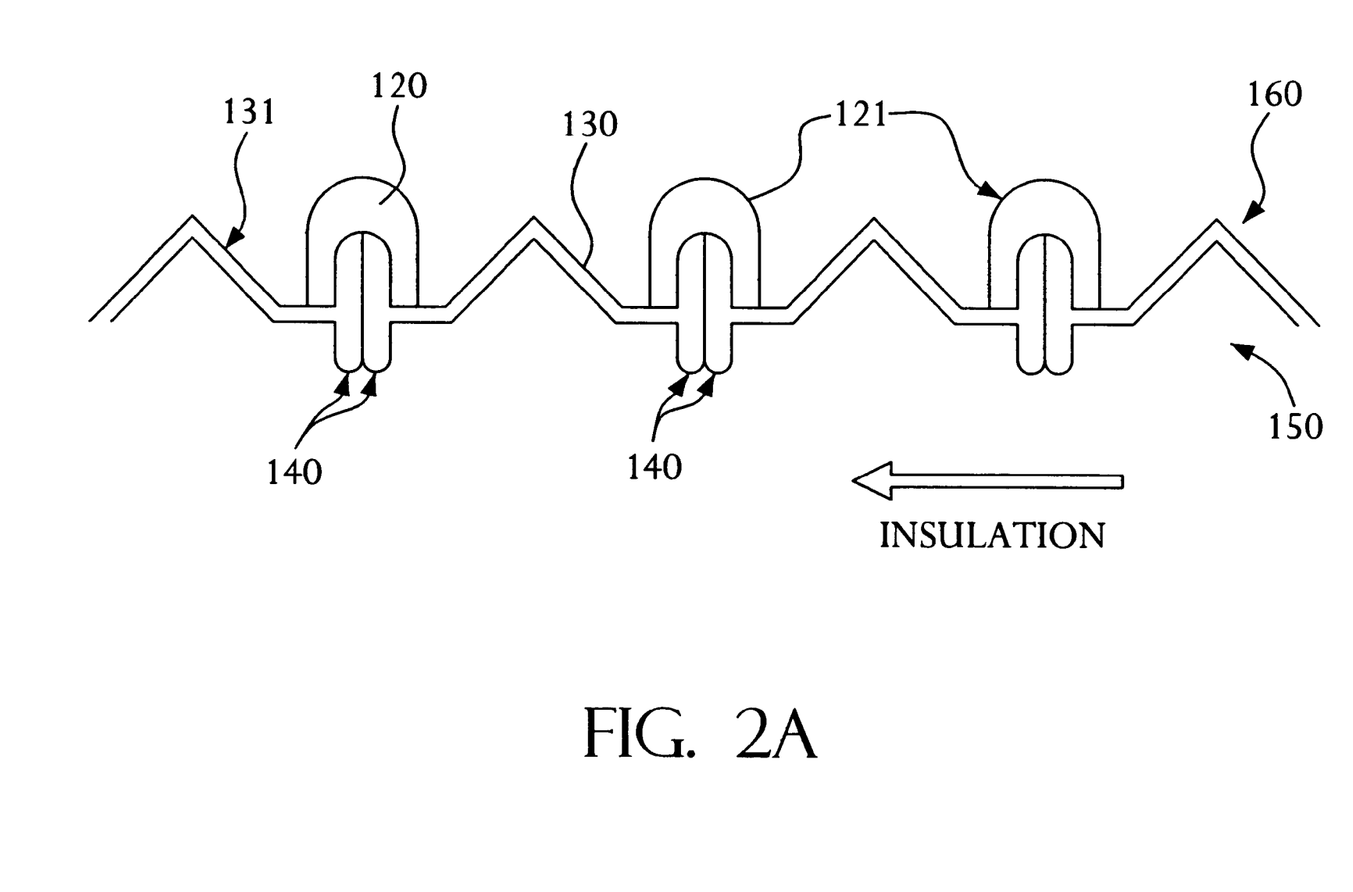
FIG. 2(a) is a cross-sectional view of the tube of the present invention with a projection according to a first embodiment.

FIG. 2(a) shows a cross-sectional view of the tube 100 of the present invention taken along section line 2(a)–2(a) in FIG. 1(a). FIG. 2(a) shows a first embodiment of the helical projection 140 of the present invention. Reference numeral 150 indicates the inner portion of the tube 100 generally, and reference numeral 160 indicates an outer portion. Insulation (indicated by the arrow) passes along inner portion 150 as it is dispensed through the tube 100. The helical projection 140 of inner web 130 extends into the inner portion 150 of the tube 100 by a specific length, typically 1/1000 of an inch (0.025 millimeters) to ¼ of an inch (6.35 millimeters), depending on the length of the insulation fiber and the diameter of the tube 100. Thus, the helical projection 140 provides a small partial obstruction in the path of insulation traveling through the tube 100.

In operation, as insulation is blown through the tube 100 by an insulation dispensing apparatus, the insulation collides with the different portions of helical projection 140, and is further "opened up" or conditioned. The individual fibers of the insulation are essentially 'grabbed' by the projection 140 as they pass through the tube 100. As a portion of the fiber is attached to the projection 140, the flow of air through the tube 100 causes the fiber to become stretched. This stretching action causes the insulation which exits the tube 100 to be better conditioned (i.e. less dense) than the insulation which enters the tube. In particular, the present invention lowers the density of the insulation fibers by approximately 10–20%. Accordingly, insulation installed using the tube 100 of the present invention is less clumpy and adheres better to the surface to which it is applied than insulation installed by conventional hoses.

Figure 2B:
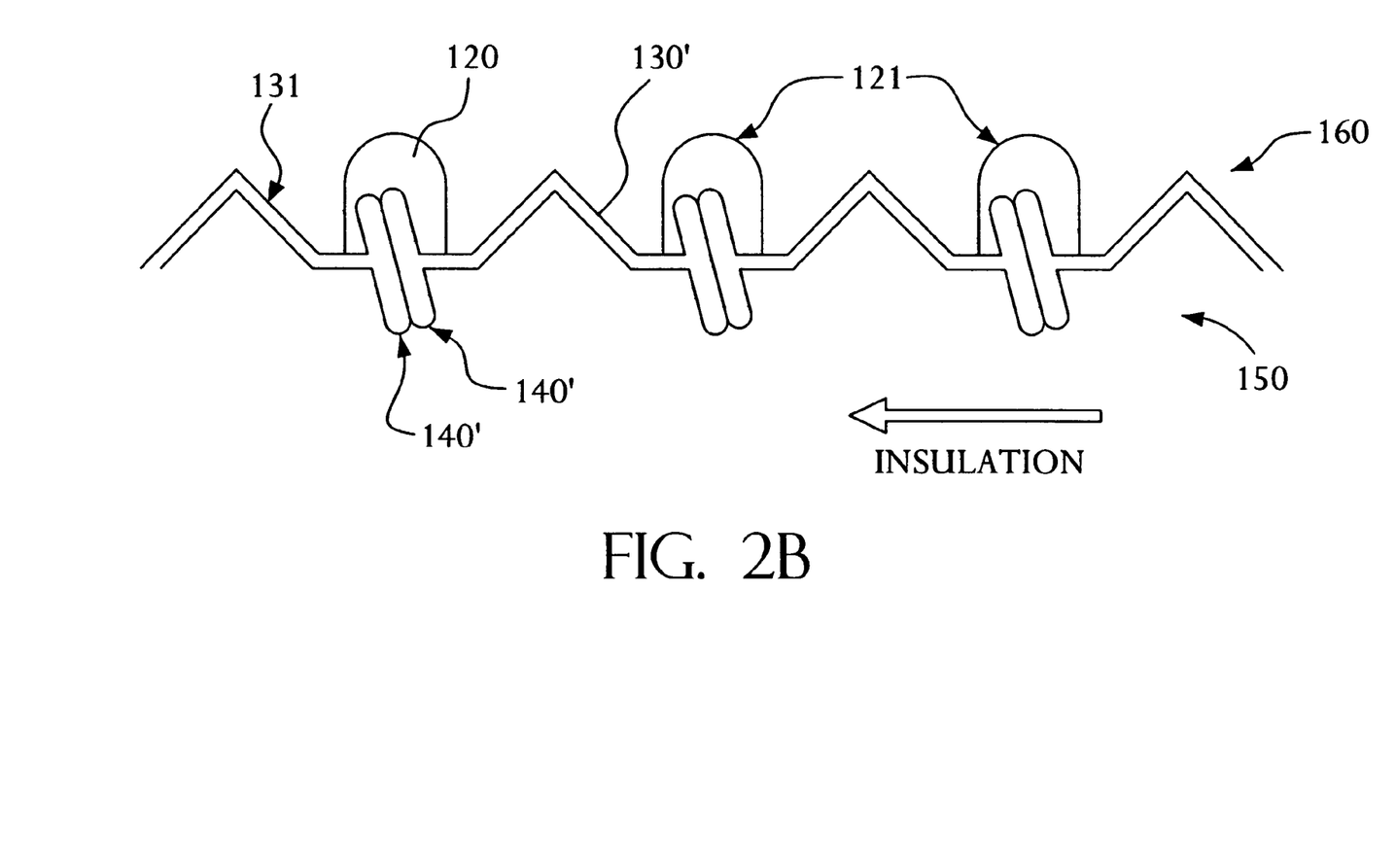
FIG. 2(b) is a cross-sectional view of the tube of the present invention with a projection according to a second embodiment.

Although FIG. 2(a) shows the helical projection 140 as being substantially perpendicular to the axis A of the tube 100 (shown in FIG. 1(a)), other embodiments of the present invention are also contemplated by the inventor. FIG. 2(b) shows a second embodiment of the present invention where the helical projection, now labeled 140', is angled with respect to the axis A of the tube 100 by an angle less then ninety (90) degrees. The exemplary projection 140' is angled so that it points towards the direction from which insulation flows through the tube in FIG. 2(b), however, the projection can alternately be angled in the opposite direction. The angling of the projection 140' can be accomplished in one of two ways. The projection 140' can be angled by extruding the inner web 130 with an angled projection. Alternately, the projection can be formed by extruding the inner web 130 as it is shown in FIG. 2(a), and angling the projection during manufacture by controlling the forward thrust of a rotating mandrel 200 (shown in FIG. 4) as the tube 100 is fabricated. The process for extruding the inner web 130, as well as the fabrication process for the tube 100, is explained in detail below with respect to FIGS. 3 and 4.

Figure 2C:
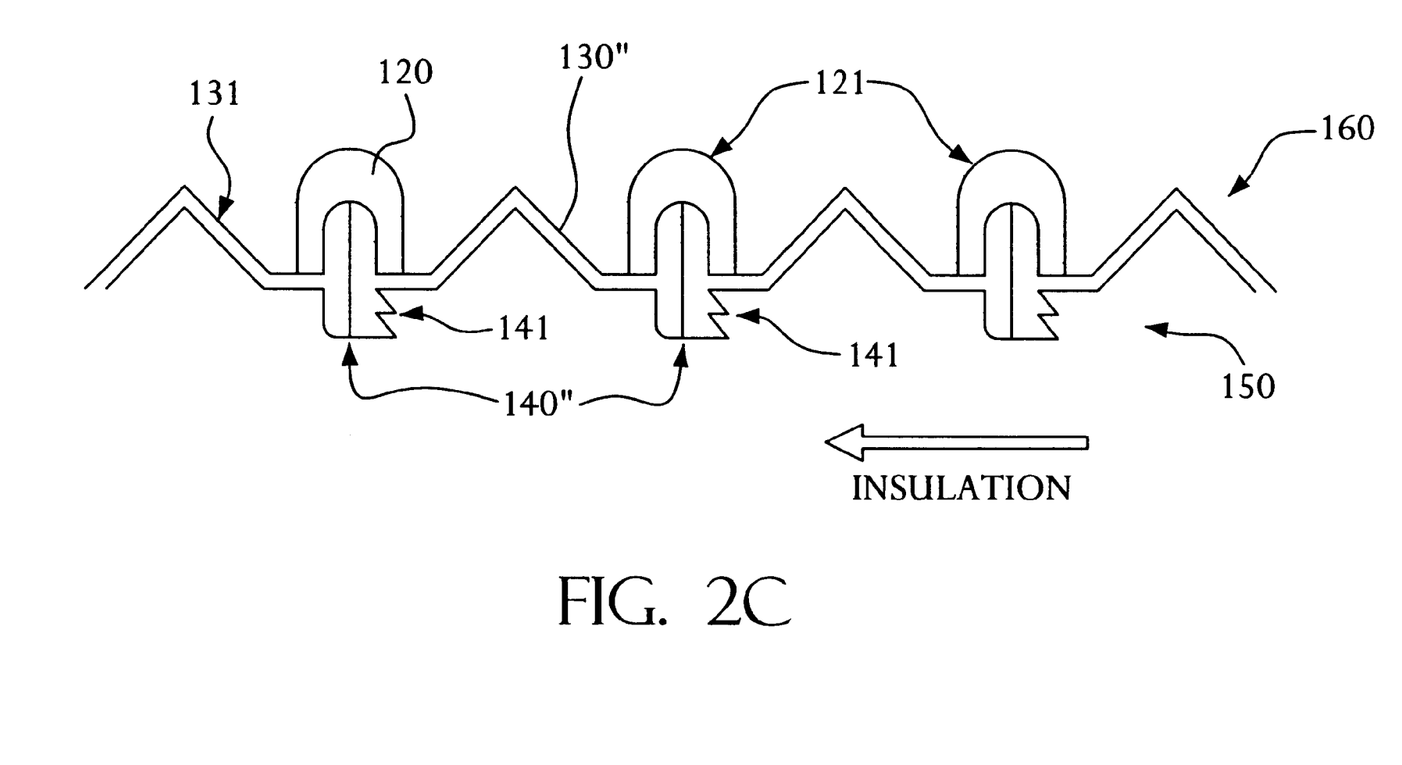
FIG. 2(c) is a cross-sectional view of the tube of the present invention with a projection according to a third embodiment.

FIG. 2(c) shows a third embodiment of the present invention where the helical projection, now labeled 140", is formed to have a serrated edge 141. This serrated edge 141 can be formed by extruding the inner web 130 with a serrated edge as explained below.

Figure 2D:
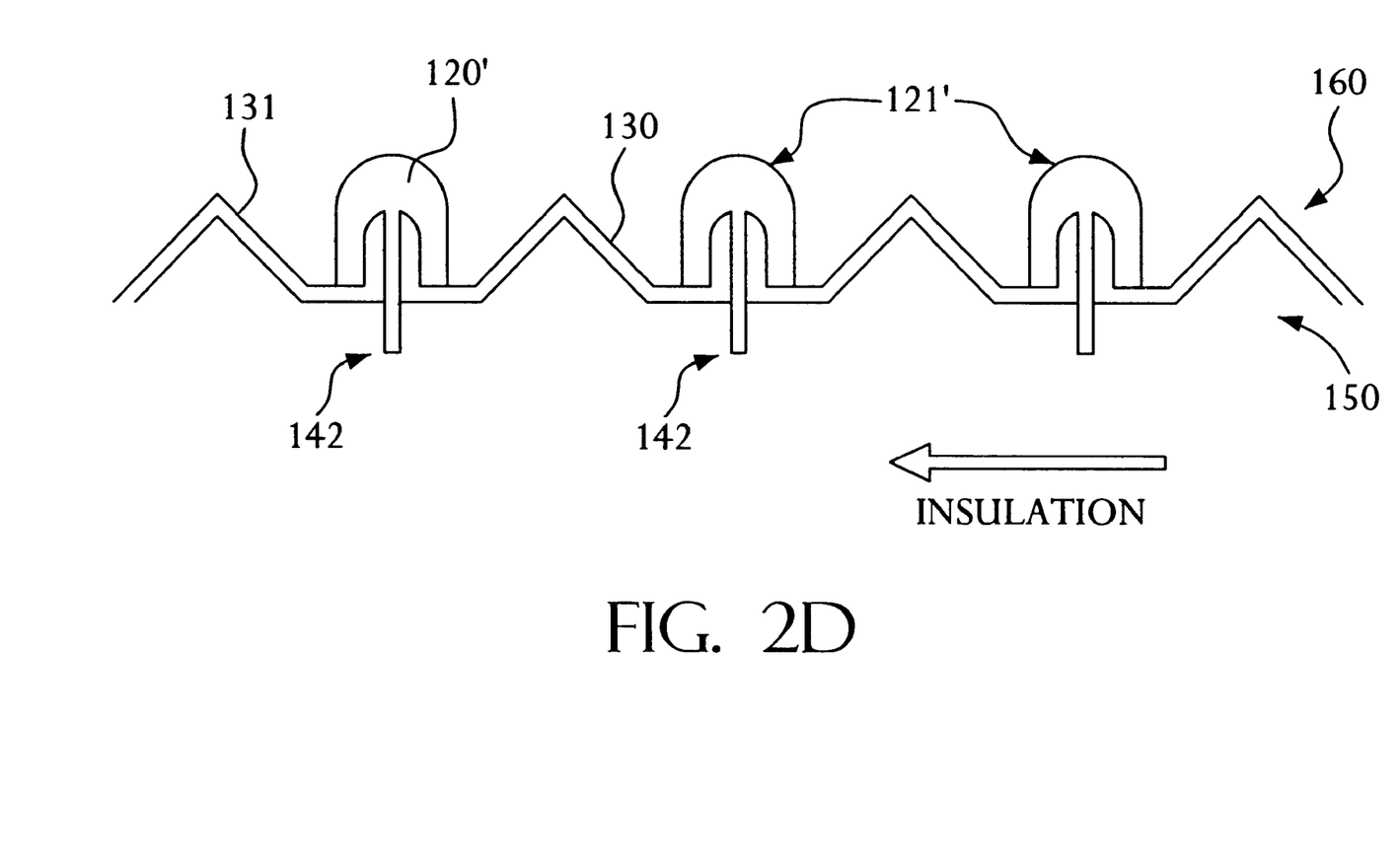
FIG. 2(d) is a cross-sectional view of the tube of the present invention with a projection according to a fourth embodiment.

FIG. 2(d) shows a fourth embodiment of the present invention where a modified outer cap 120' forms the helical projection, now labeled 142. Again, by changing the profile of the die used to manufacture the outer cap, the structure of the fourth embodiment can be accomplished as explained below.

Figure 3:
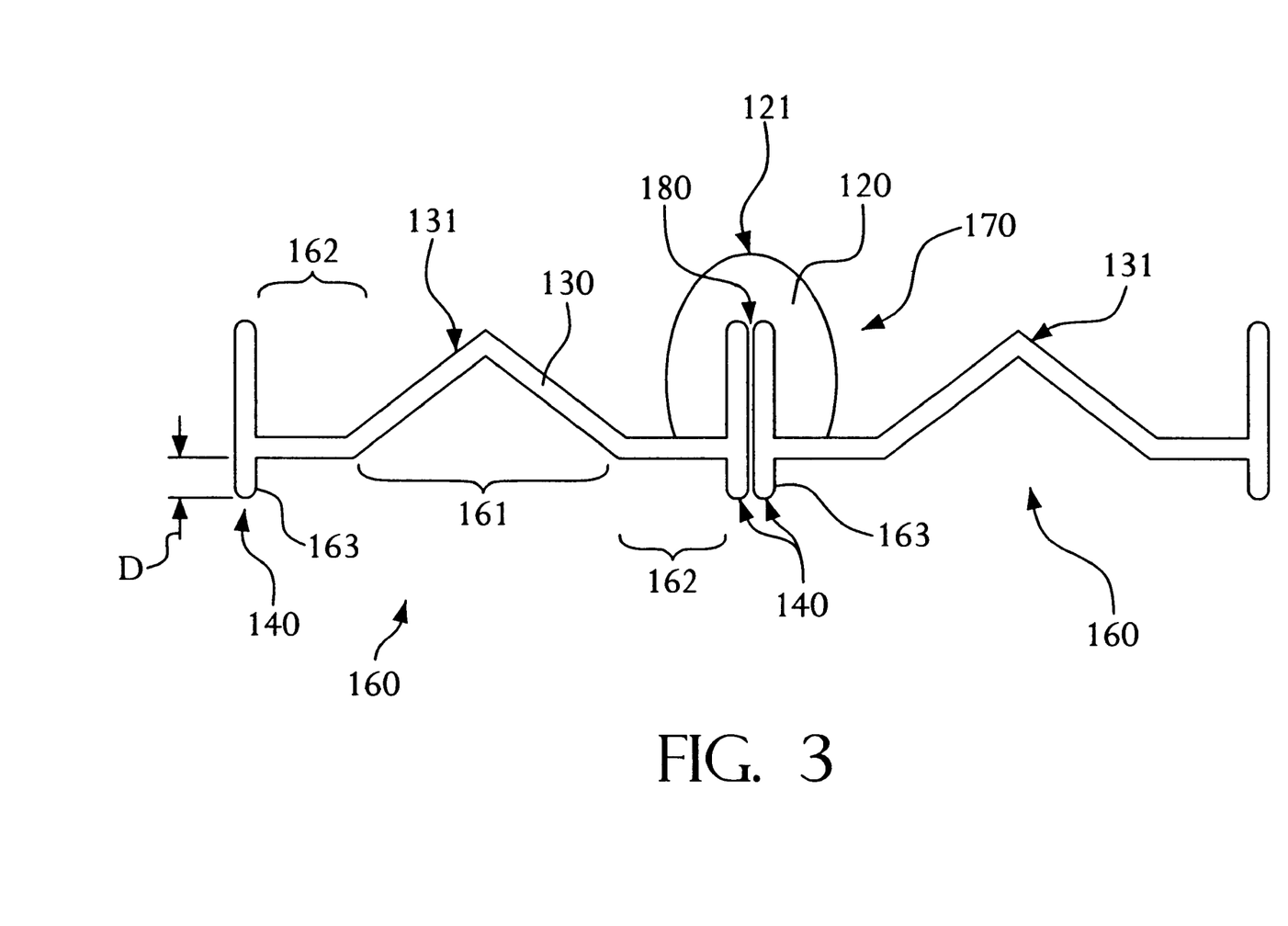
FIG. 3 is the a cross sectional view of the tube showing how the webs are attached to one another.
Figure 4:
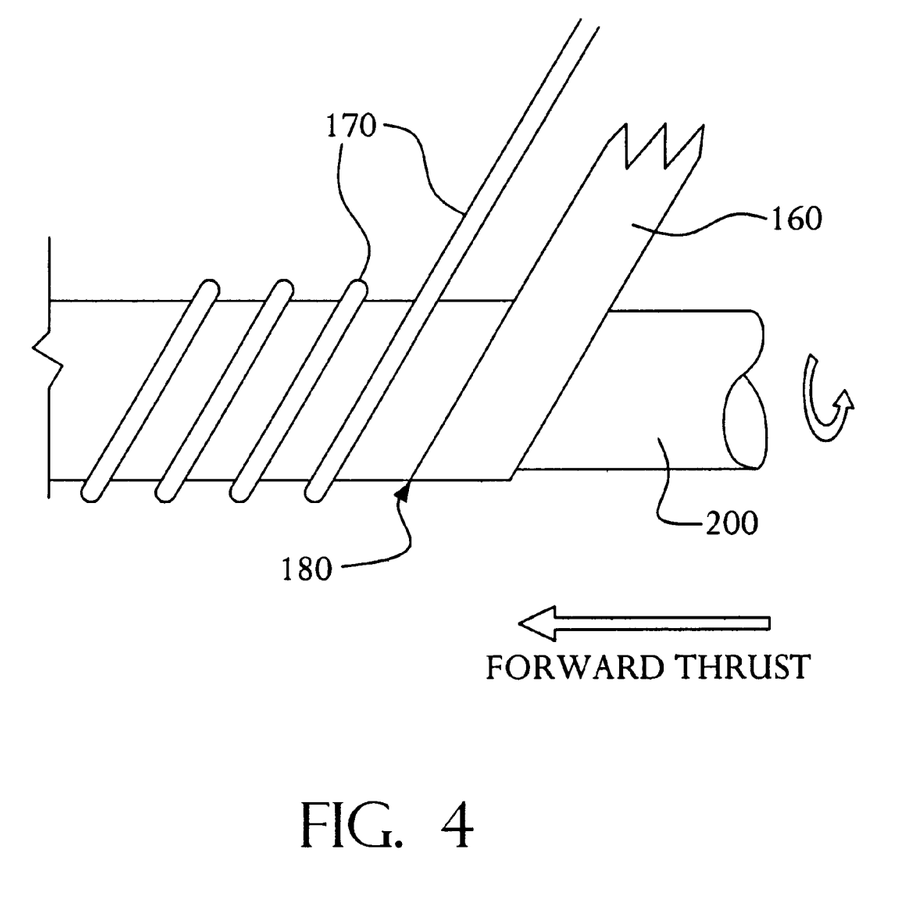
FIG. 4 is an exemplary method of forming the hose of the present invention.

FIG. 3 is a cross sectional view of the tube 100 showing how the inner web 130 (with helical projection 140) and outer cap 120 are formed. FIG. 3 shows an inner web 130 having a helical projection 140 as shown in FIG. 2(a), but the foregoing explanation applies equally as well to embodiments shown in FIGS. 2(b)–2(d). The materials for both the inner web 130 and outer cap 120 are preferably formed by extrusion of plastic through a die. The plastic may comprise any well known plastic in the art, for example, polypropalenes, urethanes, and polyvinyl chlorides may be used. However, these components need not be formed of strictly plastic, and may be formed of any suitable materials, including metals (e.g. aluminum), by any suitable process known to those skilled in the art. The inner web 130 is not formed as a cylindrical member as it is shown in FIGS. 1(a) and 1(b). The web 130 is actually formed as a tape extrusion 160 with a W-shaped cross section as shown in FIG. 3. The tape 160 is wrapped around a cylindrical rotating mandrel 200 (shown in FIG. 4) to form the cylindrical inner web 130 shown in FIGS. 1(a) and 1(b). The mandrel 200 rotates in either the clockwise or counter-clockwise (as shown in FIG. 4) direction to roll the tape 160 onto its outer surface. FIG. 3 shows a cross section of two segments of the tape 160. Each segment of the tape 160 has a W-shaped cross section with a inverted V- shaped central portion 161, and two L-shaped outer portions 162. The central portion 161 of the W-shape, when wound around the mandrel 200, creates the first helical projection 131 of the tube 100, and outer portions 162 create the second helical projection 140. The outer portions 162 are preferably formed so that lower portions 163 thereof extend below the central portion 161 by a distance D approximately 1/1000 of an inch (0.025 millimeters) to ¼ of an inch (6.35 millimeters), depending on the length of the insulation fiber and the diameter of the tube 100. The projections 163 of the inner web tape 160 create the helical projection 140 when tape 160 is wound around the cylindrical mandrel 200.

The outer cap 120 is also formed from a tape-like extrusion 170. The outer cap tape 170, however, is formed to have an inverted U-shape. The outer cap tape 170 is formed to fit over at least two outer portions 162 of the inner web tape 160 as shown in FIG. 3. The central open portion of the U-shape is approximately the same width and length as the combined width and length of the two adjacent outer portions 162. A small gap 180 exists between the adjacent outer portions 162 of the segments of tape 160. The outer cap tape 170 covers the two adjacent outer portions 162 and gap 180, and thus holds the different segments of the inner web tape 160 together to form tube 100.

As stated above, the inner web 130 and outer cap 120 can be manufactured to have different configurations than the one shown in FIG. 3. The embodiment of FIG. 2(b) can be fabricated by extruding an inner web where the outer portions 162 of the inner web tape 160 are angled by an angle less than ninety (90) degrees with respect to the central portion 161. This involves merely changing the die used to extrude the inner web tape 160. The embodiment shown in FIG. 2(c) can be formed in a similar manner by changing the shape of the die used to extrude the inner web tape 160 to have a serrated edge. The embodiment of FIG. 2(d) can be formed by changing the shape of the die used to extrude the outer cap tape 170.

FIG. 4 shows an exemplary method of forming the tube 100 of the present invention from the inner web tape 160 and outer cap tape 170. The inner web tape 160 is wound around the cylindrical rotating mandrel 200 to form the cylindrical shape of tube 100 shown in FIG. 1(a). As the tape 160 is wound around the mandrel 200, the outer cap tape 170 is melted onto the web 130. As stated above with reference to FIG. 2(b), the forward thrust of the mandrel can be controlled so as to create a helical projection 140 which is angled by an angle of less than ninety (90) degrees with respect to the axis A of the tube 100. This is accomplished by forcing the mandrel 200 forward (in the direction shown by arrow) while it is rotating. This forward thrust pulls the projections 163 of the web tape 160 in the direction of the force, and thus creates a tube 100 as is shown in FIG. 2(b).

The outer cap tape 170 is secured to the inner web tape 160 by injecting molten plastic into the area around the cap as it is wound around the mandrel 200. The cap 120 is melted onto the web 130 at gap portions 180 formed between the segments of the tape as it is wound around the mandrel 200. Thus, the cap 180 seals the different segments of the inner web tape 160, and holds the tube 100 together. The shape of the tube 100 may be altered by simply changing the shape of the mandrel 200.

Although the above explanation describes the inner web 130 as being formed in a helical shape, it may be formed in other ways without departing from the scope of the invention. Instead of being formed as a continuous helical member, the inner web 130 may be formed by a series of non-continuous rings. The non-continuous rings may be formed by manufacturing the tube 100 as described above, and thereafter cutting the helical member 140, using for example a rotating knife die, at different portions so that a plurality of non-continuous rings are formed. The cross section of a tube 100 manufactured in such a manner would appear the same as the cross sections shown in FIGS. 2(a)–2(d) and 3, the only difference being that the projection 140 would comprise a plurality of cylindrical projections rather than one continuous projection.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A tube comprising:
   an inner web formed in a tubular shape and having a helical projection disposed along an inner surface thereof extending towards a central longitudinal axis of the inner web, said inner surface of said inner web also forming an inner surface of said tube; and
   a cap disposed around an outer periphery of the inner web.

2. The tube of claim 1, wherein the cap comprises a helical extrusion disposed along the outer periphery of the inner web.

3. The tube claim 1, wherein the projection extends away from the inner surface of the inner web in a range approximately 0.025 millimeters to 6.35 millimeters.

4. The tube of claim 1, wherein the tube comprises a hose for dispensing loose fill insulation, wherein the helical projection conditions the insulation as the insulation passes through the hose.

5. A tube comprising:
   an inner web having a helical projection disposed along an inner surface thereof and extending towards a longitudinal axis of the inner web; and
   a cap disposed around an outer periphery of the inner web,
   wherein the outer periphery of the inner web includes a helical shape having a substantially W-shaped cross section.

6. The tube of claim 1, wherein the inner web is formed from an extrusion comprising:
   a first central portion which is substantially V-shaped;
   a second portion comprising two substantially horizontal members, each member attached to an opposing side of the first portion; and,
   a third outer portion comprising two substantially vertical portions connected to the horizontal portions, the horizontal portions being disposed between the vertical portions.

7. The tube of claim 1, wherein the inner web and cap are made of plastic.

8. The tube of claim 1, wherein the helical projection has a serrated edge.

9. The tube of claim 1, wherein the helical projection is angled, by an angle less then 90 degrees, with respect the longitudinal axis.

10. An extrusion for an inner web of a hose comprising:
    a first substantially V-shaped central portion;
    a second portion comprising two substantially horizontal members, each member attached to an opposing side of the first portion; and,
    a third outer portion comprising two substantially vertical portions connected to the horizontal portions, at least one of the vertical portions extending both above and below the horizontal portions, the horizontal portions being disposed between the vertical portions.

11. An apparatus for dispensing insulation comprising:
    a container for storing and dispensing insulation; and
    a tube coupled to receive insulation from the container, the tube comprising an inner web formed in a tubular shape and having a helical projection disposed along an inner surface thereof extending towards a central longitudinal axis of the inner web, said inner surface of said inner web also forming an inner surface of said tube, and a cap disposed around an outer periphery of the inner web.

12. The apparatus of claim 11, wherein the cap comprises a helical extrusion disposed along the outer periphery of the inner web.

13. The apparatus of claim 11, wherein the projection extends away from the inner surface of the inner web in a range approximately 0.025 millimeters to 6.35 millimeters.

14. The apparatus of claim 11, wherein the tube comprises a hose for dispensing loose fill insulation, wherein the helical projection serves to condition the insulation as the insulation passes through the hose.

15. An apparatus for dispensing insulation comprising:
    a container for storing and dispensing insulation; and
    a tube coupled to receive insulation from the container, the tube comprising an inner web having a helical projection disposed along an inner surface thereof and extending towards a longitudinal axis of the inner web, and a cap disposed around an outer periphery of the inner web,
    wherein the outer periphery of the inner web includes a helical shape having a substantially W-shaped cross section.

16. The apparatus of claim 11, wherein the inner web and cap are made of plastic.

17. The apparatus of claim 11, wherein the helical projection has a serrated edge.

18. The apparatus of claim 11, wherein the helical projection is angled, by an angle less then 90 degrees, with respect to the longitudinal axis.

19. A tube comprising:
    an inner web; and
    a cap disposed around an outer periphery of the inner web and extending through said inner web, said cap forming a helical projection disposed along an inner surface of the inner web and extending towards a longitudinal axis of the inner web.

20. A tube comprising:
    an inner web formed in a tubular shape with a plurality of projections disposed along an inner surface thereof and extending towards a central longitudinal axis of the inner web, said inner surface of said inner web also forming an inner surface of said tube; and
    a cap disposed around an outer periphery of the inner web.

21. The tube of claim 20, wherein the plurality of projections are cylindrical.

* * * * *